March 21, 1967  F. HEINMETS  3,310,689
PRODUCTION OF ELECTRICAL ENERGY
Filed Nov. 1, 1963  2 Sheets-Sheet 2

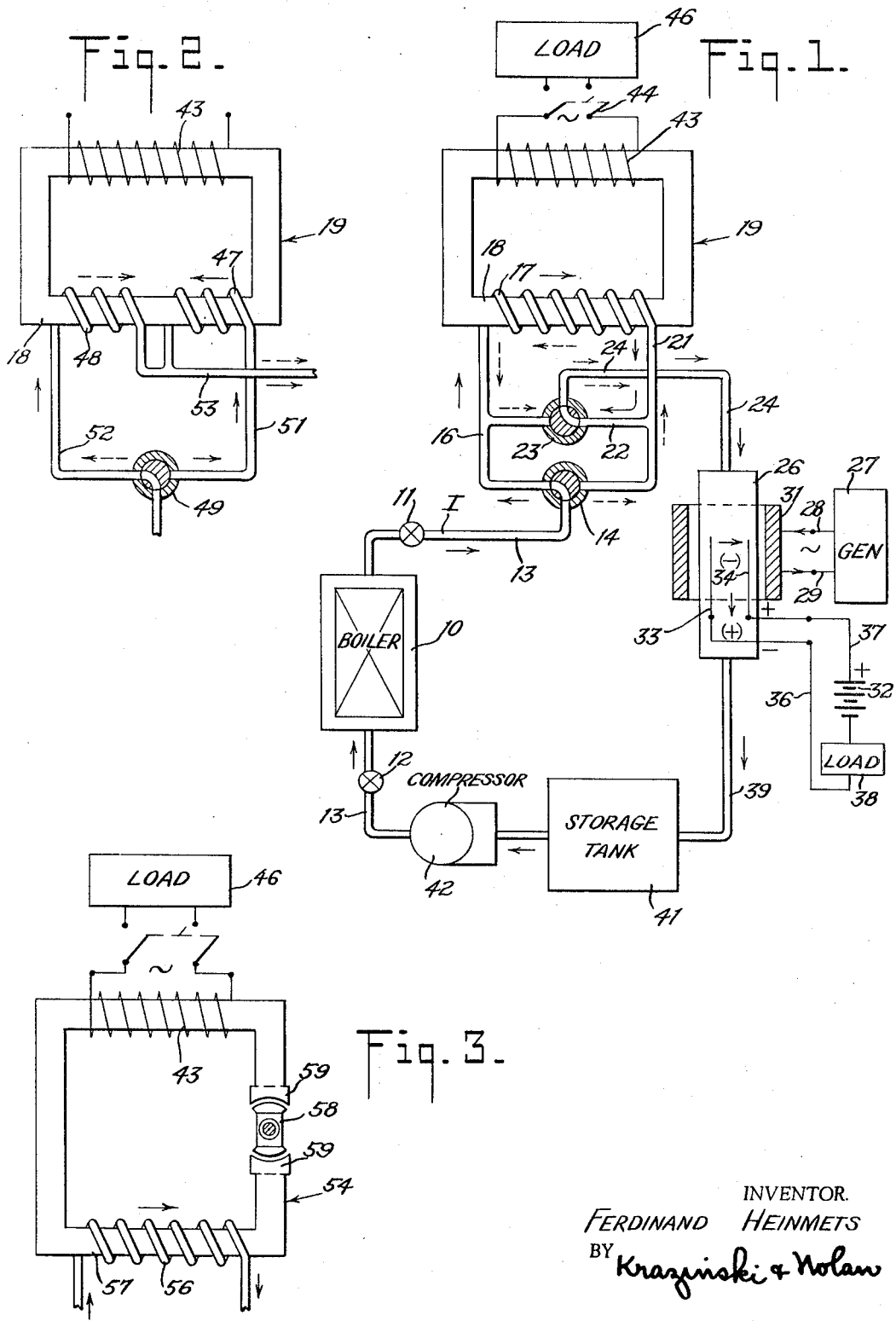

INVENTOR.
FERDINAND HEINMETS
BY Krazinski & Nolan
ATTORNEYS

United States Patent Office 3,310,689
Patented Mar. 21, 1967

3,310,689
PRODUCTION OF ELECTRICAL ENERGY
Ferdinand Heinmets, 31 Elm St.,
Wellesley Hills, Mass. 02181
Filed Nov. 1, 1963, Ser. No. 320,656
12 Claims. (Cl. 310—4)

This invention relates to the production of electrical energy, particularly to transforming the kinetic energy of charged particle flow in a conduit to the kinetic energy of electron flow in a metallic conductor, and has for its principal object to provide an improved method and apparatus therefor.

Electrical potential E associated with a time variable magnetic flux $\phi$ is expressed by the equation:

$$E = \frac{d\phi}{dt}$$

The magnetic flux $\phi$ may be produced by various charged particles. In conventional practice the magnetic flux $\phi$ is produced by a flow of electrons through a metallic conductor. In this invention a fluctuating magnetic field is developed by the flow of gas or fluid containing charged particles with a net charge per unit volume through a closed conduit system. By coupling the flux of this fluctuating magnetic field with a magnetic core, as in a transformer, to a metallic circuit the net particle energy present in the gas or fluid is transformed into electron flow in the metallic circuit.

It is, therefore, another object of the invention to convert the energy of a flowing liquid containing ions into electrical energy.

It is still another object of the invention to convert thermal energy into electrical energy from combustion sources, such as coal, oil, atomic reactors, solar radiation, etc. in a more efficient manner.

It is a further object of the invention to convert heat energy into electrical energy by relatively simple equipment with substantial reduction in cost as compared to conventional systems.

It is still a further object of the invention to convert heat energy into electrical energy by the employment of substantially lower temperatures than were heretofore possible, thereby enabling use of a wider range of thermal energy levels and variety of heat sources including heated gases, atomic reactors, radiation of sun, etc.

It is yet another object of the invention to convert thermal energy directly into alternating current.

With the above objects in view one embodiment of the invention discloses a converter in which the flow of the charged particles in the gas or fluid is alternated through a closed conduit system, as a primary winding of a transformer, to produce an alternating magnetic flux in the core of the transformer and, in turn, an alternating potential in the secondary winding thereof.

In another embodiment of the invention the flow of the charged particles in the gas or fluid is unidirectional in the closed conduit system of the transformer and the unidirectional magnetic flux is fluctuated to produce a resultant fluctuating magnetic flux in the transformer core and, in turn, an alternating potential in the secondary winding thereof.

A more complete understanding of this invention will be obtained from the detailed description which follows by reference to the appended drawings wherein:

FIG. 1 is a schematic-block diagram of an apparatus for converting kinetic energy of charged particles into electrical energy.

FIG. 2 is a schematic diagram of the ionic transformer shown in FIG. 1 with the mid point of the primary winding brought out to form two tubular windings.

FIG. 3 is a schematic diagram of another embodiment of the ionic transformer of FIG. 1 wherein unidirectional ionic charged particle flow in the tubular primary coil is converted to alternating current by a rotating pole piece in the core.

Figure 4:
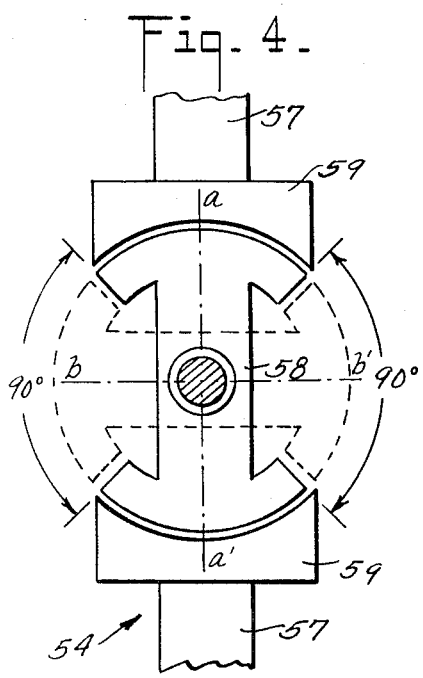
FIG. 4 is an enlarged view of the rotor assembly shown in FIG. 3 in which the angular placement of the parts is shown more clearly.

In this invention all energy conversions from the thermal state to the electrical state are produced without moving mechanical parts, except in the auxiliary or accessory equipment, by means of electromagnetic coupling between moving electrical charges. Such conversion is very efficient in that it provides the shortest pathway for transforming the kinetic energy of ionized gases (ionic current flow) into electrical energy in metallic conductors (electronic flow in conductors). Further, conversion of the kinetic energy of ionized gas into electrical energy can be carried out at a wide range of temperatures of the ionized gas. High temperatures are not required, such as are essential for conventional thermal energy conversion processes. The invention can also be practiced under a wide range of pressures and potentials, there being no limits for upper and lower values except that of materials and economic considerations.

The invention will be most readily understood from a detailed description of the operation.

Referring now to the drawings, particularly to FIG. 1, there is shown one embodiment of the invention for converting thermal energy of an ionized gas into electrical energy. A gas, vapor or liquid is heated in a closed boiler 10 to a desired temperature, such as 500°–2000° C., which temperature range is similar to that used in conventional gas or steam turbines, by means of heat energy obtained from a furnace (not shown) using suitable fuels, such as coal, oil, gas, atomic reactor, or solar radiation. While the ionic gas is being heated, its pressure increases and at a suitable pressure, say between 100 and 200 atmospheres (kg./cm.$^2$), valves 11 and 12 are opened and the ionic gas I flows in a conduit 13, which is made of a material that is an electrical insulator, such as a metallic tube having its inner wall coated with a ceramic layer. The flow of gas is in the direction of the solid arrows and it will be seen that with two-way valve 14 open the gas proceeds through this valve along conduit 16 into and through a tubular coil 17 which is wound around an iron core 18 of an electrical transformer 19. Tubular coil 17 serves a similar function as a primary coil in a conventional electrical transformer. The ionic gas I flows out of coil 17 into conduit 21, thence into conduit 22, through open valve 23 and conduit 24 into an ionization chamber 26. A high frequency electrical current, which is provided by a suitable generator 27, flows therefrom via conductors 28 and 29, through a winding 31 to produce an alternating electromagnetic field in the ionization chamber 26. The electromagnetic field disassociates the ionic gas I into positive ions and electrons. A direct current potential is applied by a battery 32 to metallic electrodes 33, 34 via conductors 36, 37, respectively, with the result that the electrons are attracted to the positive electrode 33 and the positive ions are attracted to the negative electrode 34. An electric current will flow in this direct current circuit when it is closed by a suitable load 38.

Since the electrons are of a much smaller mass than that of the positive ions and since the electrons have a much higher velocity than that of the positive ions, the current flowing in the above direct current circuit is predominantly electron flow. As a consequence, more electrons are removed from the ionic gas I than positive ions, so that an excess of positive ions remain in the ionic gas I. Thus, the ionic gas I flowing out of the ionization chamber 26 and through conduit 39 and storage tank 41 contains a net positive charge per unit volume. As the technique of forming positive ions by a high frequency magnetic field is well known in the art, it need not be further considered. The ionic gas with its excess positive ions is then pumped into the boiler 10 by a compressor 42. In this manner the ionized gas is recirculated through the above path until a suitable concentration of positive ions has been formed per unit volume of gas. It is desirable to obtain the highest possible concentration of positive ions per unit volume of gas, since operation of the system is more economical at high concentration of positive ions. By conventional methods relatively large fractions of molecules can be converted into ions (10%–20% or more) and by using the above outlined procedure for ion formation a circulating positive ion flow will be maintained through the primary tubular coil 17. It is to be noted that all conduits and all interior surfaces of the boiler 10, valves 11, 12, 14 and 23, ionization chamber 26, storage tank 41 and compressor 42 have to be coated with a material which is an electrical non-conductor, such as ceramic material, so that the discharge or loss of positive ions is so small that it is insignificant. It should be also noted that the diffusion velocity of the positive ions through the material is extremely small and can be discounted as an insignificant loss factor. Consequently, a continuous flow of positive ions can be maintained through the primary coil 17. Since the movement of any charge represents an electric current, the flow of ionized gas containing a net positive charge represents a flow of electrical current through the primary coil 17.

In order to show that such ionic current has significant magnitude to be of practical importance, the following examples are presented:

EXAMPLE 1

*Argon*

Ionized polyatomic gas produced by high frequency electromagnetic fields, in the range of 1000 mc./sec., is rather hot, while monatomic ionized argon is cool. Heat produced in polyatomic gas results from association of disassociated molecules. Since argon is monatomic and does not combine with any other element, it is preferred, its atomic weight being 39.9 and its density, 1.8 grams per liter.

Assume that the average pressure of the ionic gas I flow through the tubular primary coil 17 is 10 kg./cm.$^2$ and that the ionized argon gas contains 5% of excess positive ions, then the total number of moles at 10 atmospheres per liter is:

$$\frac{1.8 \times 10}{39.9} = 0.45$$

The number of excess positive ions per liter is:

$N^+ = 6 \times 10^{23} \times 0.45 \times 0.05 = 1.35 \times 10^{22}$ Pos. ions/ltr.

where Avogadro's number is $6 \times 10^{23}$.

Cross section area of tubular coil 17: 1.0 cm.$^2$; flow velocity of gas I is 10,000 cm./sec.

Room temperature = 20° C.

Volume of gas passing through the coil 17 is:

1.0 cm.$^2 \times 1 \times 10^4$ cm.$^3$/sec. = $1 \times 10^4$ cm.$^3$/sec.
$\qquad$ = 10 ltr./sec.

Total number of excess positive ions passing through the coil 17 is:

$N_t^+ = 10 N_1^+ = 10 \times 1.35 \times 10^{22}$
$\qquad = 1.35 \times 10^{23}$ excess pos. ions/sec.

Amp./sec. is equivalent to $6.2 \times 10^{18}$ electronic charges per second. Assuming single ionization of argon then the charge of positive ion has the same absolute value as an electron. Consequently, the ionic-current flowing through the coil 17 is:

$$\frac{1.35 \times 10^{23}}{6.2 \times 10^{18}} = 22{,}000 \text{ amps.}$$

EXAMPLE 2

*Mercury (gas)*

Assume the following data:
Temperature: 540° C.
Density of gas at 540° C.: 40 gr./ltr.
A.W.: 200
Flow velocity of gas: $10^4$ cm./sec.
Cross section of tubular coil 17: 1 cm.$^2$
Total flow through tubular coil 17:

$$10^4 \times 1 = 10^4 \text{ cm.}^3/\text{sec.} = 10 \text{ ltr./sec}$$

Weight of gas flowing through the coil 17:

$$40 \times 10 = 400 \text{ gr./sec.}$$

Number of moles of gas flowing:

$$\frac{400}{200} = 2 \text{ moles}$$

Assume 5% ionization of gas, then the number of ions flowing:

$$2 \times 6 \times 10^{23} \times 0.05 = 6 \times 10^{22}$$

and the ionic current flowing through the coil 17:

$$\frac{6 \times 10^{22}}{6 \times 10^{18}} = 10{,}000 \text{ amps.}$$

Both of the above examples reveal very large current values and, since higher levels of ionization are obtainable than that used in the above calculations (5%), it is quite evident that this invention is suitable for large scale thermal energy conversion to electrical energy.

In order to convert the ionic current flowing through the tubular primary coil 17 into alternating current flowing in a metallic winding, such as a secondary winding of the transformer 19, it is necessary to alternate the ionic current flow. This is accomplished in FIG. 1 by simultaneously rotating the two way valves 14 and 23 to their respective open and closed positions by such well known means as make it not necessary to illustrate the same herein. Briefly, the ionized gas I flows through the coil 17 in one direction, shown by solid arrows, at one instant while the gas I flows in a reverse direction, shown by dotted arrows, at another instant. The coil 17 then has flowing through it an alternating ionized gas which represents an alternating electric current. This flow of ionic current is analogous to flow of alternating electric current through a primary coil of an electric transformer.

Similarly the alternating ionic current in coil 17 produces an alternating magnetic flux in the ion core 18 of the transformer 19, around which core 18 is wound the metallic secondary winding 43 and through which secondary winding is introduced an alternating potential by the magnetic flux. The operation of the ionic transformer 19 is basically similar to the conventional electric transformer, except that in the instant ionic transformer an ionic current flows through the tubular primary coil 17, while in the conventional transformer an electric current flows through a metallic primary winding. When the secondary winding 43 is connected by a switch 44 to a suitable load 46, a secondary current will flow through winding 43 and thus power will be extracted from the system.

While the ionic transformer 19 exhibits similar operational characteristics to that of the conventional electric transformer, there is a distinct difference in the functioning of the primary tubular winding 17. The conventional electric transformer transforms electric currents and potentials from one metallic winding to another metallic winding, whereas the instant ionic transformer 19 transforms ionic currents into electronic currents and the reverse. Further, with the instant ionic transformer 19 it is possible to convert the kinetic energy of ions and neutral gas molecules flowing in a tubular coil into electrical energy flowing in a metallic coil.

How such an energy conversion takes place can be explained as follows:

Let $I$ = electric current
$q$ = charge of the ion
$n$ = the number of ions passing through the cross section
$v$ = velocity of ionic flow
$k$ = constant $$I = nq.v \quad (1)$$

When the ionization level in a gas is kept constant, then:

$$I = kv \quad (2)$$

This relation shows that current instensity depends directly on the average velocity of ionic flow. In an ionized gas neutral molecules and excess of positive ions exchange kinetic energy by collisions. When electrical energy is extracted from the secondary winding 43 of the ionic transformer 19, the secondary alternating current in this winding 43 induces a potential in the primary coil 17, which potential exerts a force on the positive ions in the opposite direction to their movement. Thus the velocity of the positive ions is reduced. As indicated by Equation 2 this is equivalent to a reduction of current. To maintain a constant current in the winding, the pressure of the ionized gas in the boiler 10 must be increased, which in turn keeps constant the predetermined ionized gas velocity. This pressure increase can be accomplished by heating the gas. Thus the thermal energy introduced into the boiler 10 can be extracted from the secondary winding 43 as electrical energy.

When the ionic gas is completely ionized, that is, when the gas consists of one hundred (100%) percent positive ions and while electric energy is being extracted from the secondary winding 43, the reduction of ionic velocities in the primary coil 17 results in a reduction of kinetic energy in the primary gas, as well as a lowering of the temperature thereof. This means that an equivalent amount of kinetic energy in the ionized gas is lost to that of the secondary electrical energy output. When gas is only partially ionized, then only the ions themselves are slowed down by "electromagnetic braking" while the movement of neutral molecules thereof is not directly affected. However, because of frequent collisions between the ions and the neutral molecules, the kinetic energy is equalized and the average energy per ions and molecules is reduced. As a result, the temperature of the partially ionized gas is also lowered, since the temperature is a function of the average velocity of the molecules and ions. Therefore, the temperature drops as the velocity drops.

The power output of the ionic transformer 19 can be controlled by increasing or decreasing the pressure of the ionized gas in the boiler 10. This will be accomplished by increasing or decreasing the thermal energy input into boiler 10. Basically the ionic transformer does not require high operating temperatures, since ionization of gas is accomplished by high frequency electromagnetic fields and not by thermal disassociation of neutral gas molecules into ions and electrons as in other systems.

Referring now to FIG. 2, there is shown another embodiment of the transformer 19 and particularly the tubular coil 17 of FIG. 1 which has been sub-divided into two coils 47 and 48 connected in parallel, which arrangement permits faster alternating gas flow. Here ionized gas enters through a rotating valve 49 into a conduit 51 and the tubular coil 47 in the direction, shown by solid arrows, during a first cycle and into conduit 52 and the tubular coil 48 in the direction, shown by dotted arrows, during a second cycle and thence out through conduit 53. It is seen that the flow through the coils 47, 48 in the core 18 is in a reverse direction, as indicated by the arrows. The movement of the valve 49, as well as those valves 14 and 23 in FIG. 1, can be designed in such a way that the pulsing flow of ionic gas through coils 47 and 48 acquires a pattern which yields currents in the secondary coil 43 of desired characteristics, for example, sinusoidal.

In FIG. 3 there is shown still another embodiment of an ionic transformer 54 having a primary tubular coil 56 wound around a core 57, wherein a unidirectional, constant flow of ionized gas is presented through the coil 56, and without the rotating valves shown in FIG. 1 or FIG. 2. This embodiment is desirable where large volumes of ionized gas are passed through a tubular primary coil, particularly for large power conversion and where it is desired to control accurately the curve shape and frequency of the secondary current. The iron core 57 is shaped in conventional manner, but it contains a rotating pole piece 58 which produces fluctuations in the magnetic pathway between the core 57 and the rotating pole piece 58, by increasing and decreasing the surface area of magnetic coupling through the air space between the rotating pole piece and the stator 59. The general characteristics of such an ionic transformer 54 can be approximately presented by the following theoretical analysis. It is assumed here that the iron core 57 has infinite permeability, there is no hysteresis loss and the magnetic conductance is linear.

The following notations are used:

$w$ = angular velocity
$L$ = self inductance
$M$ = mutual inductance
$t$ = time
$\phi$ = magnetic flux linkage
$R_2$ = resistance of secondary transformer coil
$R_1$ = equivalent electrical resistance of mechanical ionized gas flow resistance in tubular primary coil 56 (FIG. 3)
$c_1$ = a constant, indicating a constant gas pressure in primary coil
$i_1$ = ionic current
$i_2$ = electric current
$e$ = electrical potential Subscript one (1) indicates the primary side and subscript two (2) indicates the secondary side of the ionic transformer.

Electric potential, induced by time variable magnetic flux is $$e = \frac{d\phi}{dt}$$

Where $$\phi = Li$$

Two cases are of interest:
(a) When L is a constant, then $$e = L\frac{di}{dt} \quad (3)$$

This applies for an ideal electric transformer and ionic transformer (FIG. 1). Such analysis is well known and is not presented here.

(b) When L is a function of time (this is the case for ionic transformer in FIG. 3), but is independent of $i$.

$$e = \frac{d(Li)}{dt} = L\frac{di}{dt} + i\frac{dL}{dt} \quad (4)$$

When an ionic transformer has in the secondary an electrical power output, differential equations can be formulated.

The system has been so designed that:

$$L_1 = L_0 \sin wt \quad (5)$$

and it is assumed that $L_1 = L_2 = M$

For the primary coil 56:

$$c_1 = R_1 + i_1 + \frac{d(L_1 i_1)}{dt} + \frac{d(M i_2)}{dt}$$

After substitutions and differentiations:

$$c_1 = R_1 i_1 + w L_0 \cos wt \, (i_1 + i_2) + L_0 \sin wt \left(\frac{di_1}{dt} + \frac{di_2}{dt}\right) \quad (6)$$

For the secondary coil 43:

$$-e_2 = R_2 i_2 + \frac{d(L_2 i_2)}{dt} + \frac{d(M i_1)}{dt}$$

After the substitutions and differentiations:

$$-e_2 = R_2 i_2 + w L_0 \cos wt (i_1 + i_2) L_0 \sin wt \left(\frac{di_1}{dt} + \frac{di_2}{dt}\right) \quad (7)$$

An analog computer analysis of Equations 6 and 7, combined with energy balance equations will yield solutions with the following results:

(a) Secondary current and potential have alternating characteristics.

(b) Primary current has a direct current and alternating current component.

(c) A power output is obtained in the secondary side and a power input in the primary side.

Laboratory experiments with a model transformer where both primary and secondary coils were electrical, demonstrated that a constant direct current voltage at the primary coil 56 produced an alternating current in the secondary coil 43, when the latter was loaded with ohmic resistance.

In summary, theoretical analysis and laboratory experiments with a model reveal that the transformer design presented in FIG. 3, will produce an alternating current secondary output when the primary potential is constant. This is equivalent to an ionic transformer where the pressure of the ionized gas between the inlet and the outlet of the primary tubular coil 56 is kept constant, while the secondary coil 43 supplies power output to a load 46.

In FIG. 4 there is shown the rotor-stator arrangement of FIG. 3 in greater detail, particularly in regard to their angular placement. It was shown in the preceding calculations that inductance $L = L_0 \sin wt$. This is obtained by properly shaping the rotor and stator pole pieces 58 and 59, respectively. Rotor 58 has two pole pieces, each with an angular extension of 90°. In FIG. 4 the vertical dash-dot line $a$–$a'$ indicates the position of the maximum magnetic coupling between stator 59 and rotor 58 while the horizontal dash-dot line $b$–$b'$ indicates the position of the minimum magnetic coupling therebetween. The shape of the rotor pole piece 58 is rectangular, and that of the stator 59 is sinusoidal, as shown by the curves 61 and 62, respectively, in FIG. 5. Both rotor and stator in this figure are shown in the position of maximum magnetic coupling. The air space between the rotor 58 and the stator 59 is made small, in order to obtain maximum magnetic linkage. When the rotor 58 sweeps over the sinusoidal stator surface, integration yields a cosine function.

Figure 5:
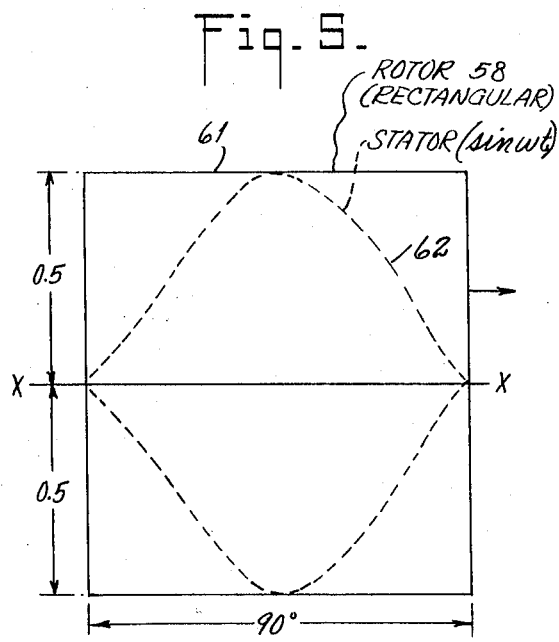
FIG. 5 is a diagram showing the sinusoidal shape of the stator and rectangular shape of the rotor in the assembly of FIG. 4.

In further examining FIG. 5 it will be noted that the sinusoidal surface 62 is equally divided between the central horizontal axis $x$—$x$. When it is desired to change the characteristics of the magnetic flux linkage, as a function of time, the shapes of the rotor and stator surfaces can be altered. Hysteresis distortion of the magnetic linkage can be corrected by adding surfaces to the rotor or stator. A variety of secondary output current and voltage curve forms can be obtained by designing various pole piece surfaces, that is, stator: $\sin^2 wt$, etc. The frequency of rotation of the rotor 58 determines the frequency of the secondary currents and potentials. Therefore, by changing the rotational speed of the rotor 58 the frequency of the secondary potentials and currents can be accordingly changed. When in FIG. 2 the tubular primary coils 47, 48 are replaced by regular transformer metallic coils, then the transformer can be used to convert direct current electrical energy into alternating current energy. They also can serve as a variable frequency generator. Further, when the transformer core is made of iron, which is a permanent magnet, then the transformer can be used to produce high potentials at minimum cost.

From the foregoing description it will be seen that the present invention provides an improved, simple, reliable and economical method and apparatus for producing electrical energy.

As various changes may be made in the form, construction, and arrangement of the parts herein, without departing from the spirit and scope of the invention and without sacrificing any of its advantages, it is to be understood that all matters are to be interpreted as illustrative and not in any limiting sense.

What is claimed is:

1. A device for producing electrical energy comprising a magnetic member, a nonconductive tubular coil wound around said magnetic member, a metallic coil spaced from said tubular coil and wound around said magnetic member, a fluid containing a net charge per unit volume flowing through said tubular coil, and means for producing a variable magnetic flux in said magnetic member, whereby said variable magnetic flux in said magnetic member induces a variable electric potential in said metallic coil.

2. A device for producing electrical energy in accordance with claim 1, wherein the direction of said fluid flowing through said tubular coil is periodically reversed through said tubular coil to produce an alternating potential in said metallic coil.

3. A device for producing electrical energy in accordance with claim 1, and means in said magnetic member for varying said magnetic flux to produce an alternating potential in said metallic coil.

4. A device for producing electrical energy in accordance with claim 1, wherein said device is a transformer having a magnetic core.

5. A device in accordance with claim 1, wherein said charged fluid includes an excess of positive charges.

6. A device in accordance with claim 1, wherein said charged fluid includes an excess of negative charges.

7. A method of producing alternating current which comprises passing a fluid containing a net charge per unit volume through a tubular coil, forming the tubular coil around a magnetic core to cause the charged fluid to produce a magnetic flux in the magnetic core, fluctuating said magnetic flux, and forming a metallic winding around the magnetic core to link the fluctuating magnetic flux and thereby produce an alternating current in the metallic winding.

8. A method of producing alternating current according to claim 7, wherein said charged fluid comprises substantially positive particles.

9. A method of producing alternating current according to claim 7, wherein said charged fluid comprises substantially negative particles.

10. A method of producing alternating current according to claim 7, wherein said fluctuating magnetic flux is produced by alternating the flow of said charged fluid through said tubular coil.

11. A method of producing alternating current according to claim 7, wherein said fluctuating magnetic flux is produced by serially interposing a rotating pole piece in the magnetic core.

12. A device for producing electrical energy in accordance with claim 3, wherein said means in said magnetic member for varying said magnetic flux includes a rotatable rotor serially disposed in said magnetic member.

References Cited by the Examiner

UNITED STATES PATENTS

| | | | |
|---|---|---|---|
| 730,847 | 6/1903 | Van Gilder | 174—9 |
| 1,471,096 | 10/1923 | Brand | 336—62 |
| 1,981,066 | 11/1934 | Osnos | 310—11 X |
| 2,342,628 | 2/1944 | Evjen | 336—135 X |

MILTON O. HIRSHFIELD, *Primary Examiner.*

DAVID X. SLINEY, *Examiner.*